J. BRIGHT.
Bracket.
No. 209,325. Patented Oct. 29, 1878.
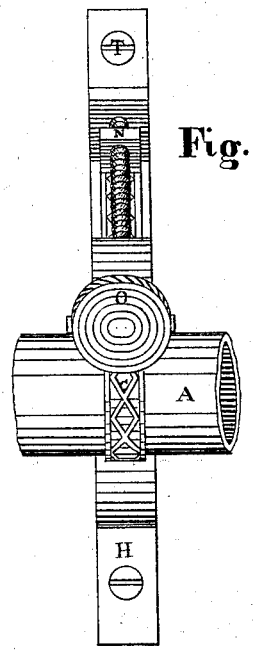
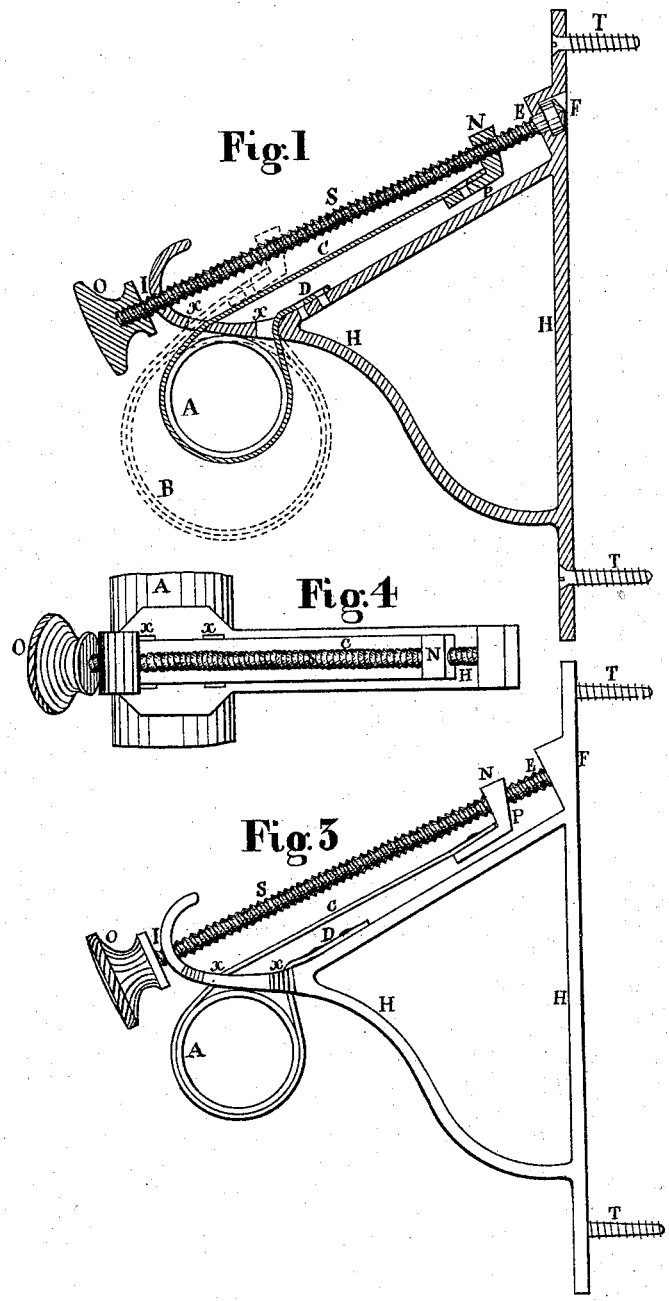

UNITED STATES PATENT OFFICE.

JAMES BRIGHT, OF NEW YORK, N. Y., ASSIGNOR OF ONE-HALF HIS RIGHT TO WILLIAM BENTLEY, OF NEWARK, NEW JERSEY.

IMPROVEMENT IN BRACKETS.

Specification forming part of Letters Patent No. 209,325, dated October 29, 1878; application filed March 19, 1878.

*To all whom it may concern:*

Be it known that I, JAMES BRIGHT, of the city and county of New York, and State of New York, have invented a new and useful Improvement in Brackets for Sustaining Cornice-Poles, which improvement is fully set forth in the following specification, reference being had to the accompanying drawings—

Figure 1 being a sectional side elevation, Fig. 2 a front view, Fig. 3 a side elevation, and Fig. 4 a plan of the same.

The same letters refer to the same parts in each figure.

The object of my invention is to make brackets for sustaining cornice-poles adjustable, so that they can be readily adapted to sustain cornice-poles of different sizes, as shown in the sectional view, Fig. 1, where H is a bracket, and A and B two cornice-poles of different sizes, the latter being shown in dotted lines. The adjustability is effected by means of an attachment consisting of a long revolving screw-rod, S, passing through apertures in the parts I and E of the bracket H, and kept in place by the head at one end in the recess F and the milled headed nut O fastened at the other end. The milled nut O is also used for turning the screw-rod S. This screw-rod has a nut, N, fitted upon it, the nut N having a projection at *p*, to which one end of the strap C is fastened, the other end of the strap C being passed through the apertures X X in the bracket H, Figs. 1 and 4, and fastened to the bracket, as shown at D.

It will be evident that upon turning the screw-rod S the nut N, not being allowed to turn with it, will traverse it lengthwise, the direction depending upon the way the screw is turned.

The cornice-poles are such as are generally used for sustaining window-curtains, and are made of metal or wood, or both combined, and not less than two or more brackets will be required to support one such cornice-pole. The brackets will, of course, be made of such sizes as are most required.

The mode of operation is as follows: Assuming that the brackets are attached to the upper part of a window-frame, or elsewhere, as required, by the screws shown at T T, the screw-rod S of each bracket is then turned to the right by means of the milled nut O until the strap C is sufficiently slack to allow the free passage of the cornice-pole of the size desired inside the loop formed thereby, and when the pole is passed through two such brackets and placed in proper position, by turning the screw-rods to the left, the nuts N in each bracket will be carried toward E and tighten the straps C round the cornice-pole, and hold the latter firmly in the position required.

I claim—

An adjustable bracket consisting of the screw-rod S, with its nut N, its milled headed nut O, the holding-strap C, with the bracket H, substantially as shown and described, and for the purposes set forth.

JAMES BRIGHT.

Witnesses:
W. S. HENSON,
JOHN D. TOPPIN.